United States Patent [19]
Aufdembrink et al.

[11] Patent Number: 5,137,707
[45] Date of Patent: Aug. 11, 1992

[54] REMOVAL OF ORGANIC FROM PILLARED LAYERED MATERIALS BY ACID TREATMENT

[75] Inventors: Brent A. Aufdembrink, Wilmington, Del.; Wieslaw J. Roth, Sewell, N.J.

[73] Assignee: Mobil Oil Corp., Fairfax, Va.

[21] Appl. No.: 780,190

[22] Filed: Oct. 22, 1991

Related U.S. Application Data

[63] Continuation-in-part of Ser. No. 600,890, Oct. 22, 1990, abandoned.

[51] Int. Cl.⁵ .................................................. C01B 33/26
[52] U.S. Cl. ........................................ 423/328; 423/327; 502/242; 502/244; 502/81; 502/84
[58] Field of Search .................. 423/328, 598, 327; 502/242, 244, 525, 81-84; 208/265

[56] References Cited

U.S. PATENT DOCUMENTS

| | | | |
|---|---|---|---|
| 4,743,360 | 5/1988 | Melin et al. | 208/254 R |
| 4,831,005 | 5/1989 | Aufdembrink | 502/242 |
| 4,859,648 | 8/1989 | Landis et al. | 502/242 |
| 4,937,222 | 6/1990 | Angevine et al. | 502/242 |
| 4,980,333 | 12/1990 | Landis et al. | 502/246 |

FOREIGN PATENT DOCUMENTS 8800090 1/1988 PCT Int'l Appl. .

*Primary Examiner*—R. Bruce Breneman
*Attorney, Agent, or Firm*—Alexander J. McKillop; Charles J. Speciale; Edward F. Kenehan, Jr.

[57] ABSTRACT

There is provided a method for the removal of residual organic swelling agent from pillared layered materials by treating such materials with acid.

8 Claims, No Drawings

REMOVAL OF ORGANIC FROM PILLARED LAYERED MATERIALS BY ACID TREATMENT

CROSS-REFERENCE TO RELATED APPLICATION

This application is a continuation-in-part of copending U.S. application Ser. No. 07/600,890, filed Oct. 22, 1990, now abandoned, the entire disclosure of which is expressly incorporated herein by reference.

BACKGROUND

There is provided a method for the removal of residual organic swelling agent from pillared layered materials by treating such materials with acid.

The preparation of pillared layered materials is described in U.S. Pat. Nos. 4,831,005 and 4,859,648, the entire disclosures of which are expressly incorporated herein by reference. These layered materials include layered silicates, such as magadiite and kenyaite, titanates such as trititanates, perovskite-related materials and vacancy titanometalates. The pillared forms of these layered materials are useful as catalysts, catalyst supports and sorbents.

Layered materials may be pillared by a process including the steps of: (1) swelling the layered material with a swelling agent to separate the layers; (2) treating the swollen layered material with an oxide precursor, such as tetraethylorthosilicate (TEOS), capable of forming an oxide upon hydrolysis; and (3) hydrolyzing the oxide precursor. Examples of swelling agents include nitrogen-containing organic compounds, such as tetraalkylammonium compounds and amines, such n-hexylamine and n-octylamine. In order to prepar pillared materials of desired surface area, it is necessary to remove residual swelling agent from the hydrolyzed product of the above-mentioned step (3). As pointed out in the above-mentioned U.S. Pat. Nos. 4,831,005 and 4,859,648, this removal of residual swelling agent may take place by calcination of the pillared material.

SUMMARY

According to an aspect of this application, there is provided a method for removing residual organic swelling agent from a pillared layered material, said method comprising contacting said pillared layered material with an acid under conditions sufficient to remove said swelling agent without chemical oxidation of said swelling agent.

EMBODIMENTS

An example of an acid which may be used to remove residual swelling agent is hydrochloric acid. Further examples of such acids include nitric acid, acetic acid and phosphoric acid.

The acid may be diluted in water alone or in combination with a cosolvent, such as an alcohol, e.g., ethanol (EtOH). The concentration of the acid diluted in solvent or solvent mixture may be, e.g., from 0.1 to 5M. Conditions for contacting the pillared material with acid may include, e.g., a temperature of about ambient (e.g. about 20° C.) to about 100° C. and a contact time of from about 10 minutes to about 1 week.

The pillared layered materials described herein may be prepared from layered oxide starting materials. Layered oxides of elements ranging in atomic number of 4, 5, 12 to 15, 20 to 33, 38 to 51, 56 to 83, and greater than 90, inclusive, may be employed as starting materials. Included are oxides of aluminum and silicon such as clays. Layered clays such as benonite may be treated in accordance with the present application. Preferably, however, the layered oxide is "non-water-swellable" which is intended to distinguish it from conventional clays which contain octahedrally coordinated metal oxide sheets bonded to tetrahedrally coordinated silica sheets and which undergo substantial swelling, sometimes by an essentially unbounded amount, when contacted with water. As used herein in relation to a layered oxide material, the term "non-water-swellable" is defined as meaning a layered oxide material, which, when contacted with at least 10 grams of water per gram of the layered oxide at 23° C. for 24 hours, exhibits an increase in d-spacing no greater than 5 Angstroms as compared with the material before treatment. Included among these materials are $H_2Ti_3O_7$, $Na_2Ti_3O_7$, and $KTiNbO_5$, as well as certain layered silicates, for example, the metasilicates. Layered, e.g., high silica alkali silicate such as magadiite, natrosilite, kenyaite, makatite, nekoite, kanemite, okenite, dehayelite, macdonaldite, and rhodesite, unlike swellable clays, lack octahedral sheets, i.e., sheets composed of atoms which are octahedrally coordinated with oxygen atoms. Such high silica alkali silicates may be utilized as starting materials in the present application as well as synthetic analogues thereof. Without stable intercalated pillars, these materials tend to have collapsed layers at elevated temperatures, low porosity and low surface areas. In some cases it has been found preferable that layered clays or silicates be treated by contacting with one or more polar organic solvents or water prior to or during exchange with the source of organic cations. The polar organic solvent used should exhibit electric dipole moments in the gas phase of at least 3.0 Debyes (D), preferably at least 3.5D, e.g., at least about 3.8D. Examples of suitable organic solvents are dimethylsulfoxide (DMSO) and dimethylformamide (DMF). A table of selected organic compounds and their electric dipole moments can be found in CRC Handbook of Chemistry and Physics, vol. 60, p. 650-658 (1975), incorporated herein by reference. It is believed that the treatment of any starting material with one or more highly polar solvents can be efficacious in facilitating the introduction of the source of organic cation between the layers of starting material. d-Spacings greater than 10, 15, 20, 25, or even 30 may be obtained by this method.

EXAMPLE 1

An octylamine swollen vacancy titanometallates were prepared as follows. $Cs_2CO_3$ (621 g) and $TiO_2$ (795 g) were fired at 650° C. three times, with intermediate grindings between firings. The fired material was ball-milled for 4 hrs (30% solids in $H_2O$), then exchanged five times with 1 M $NH_4NO_3$ (10 ml $NH_4NO_3$/g solid) at reflux for 20 hrs. After each exchange the sample was filtered and washed with 2 l hot water. The ammonium exchanged solid was swollen by refluxing in neat octylamine for 24 hrs using a Dean-Stark trap in the condensation column to remove water from the system. The swollen solid was filtered and washed with 2000 ml EtOH, then air dried. This solid was treated with tetraethylorthosilicate (5g TEOS/g solid) under nitrogen at 80° C. for 20 hrs, filtered and dried under nitrogen. The TEOS treatment was repeated twice.

EXAMPLE 2

A hexylamine/swollen material was prepared by substituting hexylamine for octylamine in the procedure described in Example 1.

EXAMPLE 3

A dilute acid solution (about 1M) was prepared by diluting 48.21 g of concentrated HCl to 250 ml and further diluting this to 500 ml with EtOH. The TEOS intercalated solid (50.0 g) was added. The solution was stirred at 70° C. for 16 hours, then cooled, filtered, and dried in air. The final product was obtained by drying at 120° C. for 16 hours. The physical and chemical properties of the products prepared from hexylamine and octylamine swollen layered titanates are compared to the TEOS treated precursor and materials prepared by calcination in air and nitrogen in Tables 1 and 2.

It can be seen that the acid treatment removes the organic swelling agent from the TEOS treated solid creating the porous molecular sieve. Substantial surface area and adsorption capacities for water and $C_6$ hydrocarbons verify the porous nature of the material.

TABLE 1

Properties of Hexylamine Swollen Solids

| | TEOS Treated | Molecular Sieve | | |
|---|---|---|---|---|
| | | H+ Treatment | Calcination | |
| | | | Air | $N_2$ |
| Ti (wt %) | 22.4 | 22.5 | 30.2 | 28.0 |
| $SiO_2$ (wt %) | 39.5 | 44.3 | 48.6 | 48.2 |
| Ash (wt %, 1000° C.) | 77.8 | 86.72 | 97.6 | 94.8 |
| C (wt %) | 9.4 | 1.07 | — | 0.42 |
| N (wt %) | 1.4 | 0.4 | — | 0.08 |
| Physical Properties | | | | |
| d-Spacing(Å) | — | 20.0 | 18.0 | 18.0 |
| Surface Area ($m^2/g$) | — | 341 | 479 | 486 |
| Adsorption (g/100 g) | | | | |
| $H_2O$ | — | 7.5 | 20.5 | 20.3 |
| c-$C_6$ | — | 9.7 | 13.4 | 13.8 |
| n-$C_6$ | — | 9.1 | 12.6 | 12.7 |

TABLE 2

Properties of Octylamine Swollen Pillared Solids

| | TEOS Treated | Molecular Sieve | |
|---|---|---|---|
| | | H+ Treatment | Calcination |
| Ti (wt %) | 18.1 | — | 23.9 |
| $SiO_2$ | 41.3 | — | 50.4 |
| Ash (wt %, 1000° C.) | 75.84 | 89.25 | 95.6 |
| C (wt %) | 11.9 | 2.05 | <.005 |
| N (wt %) | 1.29 | 0.09 | <.03 |
| Physical Properties | | | |
| Surface Area ($m^2/g$) | | 620 | 614 |
| Adsorption*(g/100 g) | | | |
| $H_2O$ | (6.9) | 23.0(15.2) | 25.3 |
| c-$C_6$ | — | 20.1 | 17.0 |
| n-$C_6$ | (5.1) | 18.5(10.4) | 15.9 |

*Numbers in parenthesis were obtained with an initial drying of 150° C. Numbers not in parenthesis were obtained with an initial calcination at 500° C.

The ability to prepare pillared materials by H+ treatment may allow preparation of new pillared materials where calcination to form the pillared product is not possible (due to thermal instability of the solid) or desirable (due to excessive emissions and environmental concerns).

What is claimed is:

1. A method for removing residual organic swelling agent from a pillared layered material, said method comprising contacting said pillared layered material with an acid under conditions sufficient to remove said swelling agent without chemical oxidation of said swelling agent.

2. A method according to claim 1, wherein said layered material is selected from the group consisting of layered silicates, titanates, perovskites and vacancy titanometallates.

3. A method according to claim 2, wherein said organic swelling agent is an amine.

4. A method according to claim 3, wherein said amine is n-hexylamine or n-octylamine.

5. A method according to claim 3, wherein said acid is hydrochloric acid

6. A method according to claim 5, wherein said layered material is a vacancy titanometallate.

7. A method according to claim 6, wherein said pillared layered material is prepared by contacting swollen vacancy titanometallate with tetraethylorthosilicate followed by hydrolysis of said tetraethylorthosilicate.

8. A method according to claim 7, wherein said hydrochloric acid is dissolved in a mixture of water and ethanol.

* * * * *